United States Patent [19]

Scherzer et al.

[11] Patent Number: 6,031,013
[45] Date of Patent: Feb. 29, 2000

[54] PRODUCTION OF POLYURETHANE FOAMS

[75] Inventors: Dietrich Scherzer, Neustadt; Ulrich Treuling, Bensheim; Jürgen Mertes, Altrip; Rolf Illguth, Ludwigshafen, all of Germany

[73] Assignee: BASF Aktiengesellschaft, Ludwigshafen, Germany

[21] Appl. No.: 09/176,423

[22] Filed: Oct. 21, 1998

[30] Foreign Application Priority Data

Oct. 23, 1997 [DE] Germany .............................. 197 46 807

[51] Int. Cl.$^7$ ...................................................... C08G 18/14
[52] U.S. Cl. .......................... 521/174; 521/128; 521/129; 521/130; 521/170; 521/172
[58] Field of Search ..................................... 521/130, 128, 521/127, 170, 172, 174

[56] References Cited

U.S. PATENT DOCUMENTS

| | | |
|---|---|---|
| 3,954,825 | 5/1976 | Touhey, Jr. et al. . |
| 4,772,639 | 9/1988 | Pilger et al. . |
| 5,039,712 | 8/1991 | Brock ....................................... 521/126 |
| 5,187,206 | 2/1993 | Volkert et al. ........................... 521/129 |
| 5,798,533 | 8/1998 | Fishback et al. .................. 252/182.25 |

FOREIGN PATENT DOCUMENTS

| | | |
|---|---|---|
| 299122A | 1/1989 | European Pat. Off. . |
| 361334A | 4/1990 | European Pat. Off. . |

OTHER PUBLICATIONS

EPO Search Report dated Jan. 22, 1999 and Translation of Same EPO Search Report.

*Primary Examiner*—John M. Cooney, Jr.
*Attorney, Agent, or Firm*—Fernando A. Borrego

[57] ABSTRACT

In a process for producing foams based on polyisocyanate polyaddition products by reacting isocyanates with compounds which are reactive toward isocyanates and have a molecular weight of from 400 to 8000 in the presence of blowing agents, catalysts and, if desired, chain extenders and/or crosslinkers having a molecular weight of <400, auxiliaries and/or additives, use is made of isocyanates having isocyanurate and/or biuret structures, at least one compound which is reactive toward isocyanates, has a molecular weight of from 400 to 8000 and contains at least 50% primary hydroxyl groups, as catalysts at least one tertiary amine and at least one metal salt plus from 0.5 to 5.3% by weight of water, based on the weight of the compounds which are reactive toward isocyanates and have a molecular weight of from 400 to 8000, and the reaction is carried out at >40° C.

10 Claims, No Drawings

2

PRODUCTION OF POLYURETHANE FOAMS

BACKGROUND OF THE INVENTION

The invention relates to a process for producing foams based on polyisocyanate polyaddition products by reacting isocyanates with compounds which are reactive toward isocyanates and have a molecular weight of from 400 to 8000 in the presence of blowing agents, catalysts and, if desired, chain extenders and/or crosslinkers having a molecular weight of <400, auxiliaries and/or additives, and also to foams based on polyisocyanate polyaddition products which can be produced by this process.

The production of foams based on polyisocyanate polyaddition products, usually polyurethane and possibly polyisocyanurate products, by reacting isocyanates with compounds which are reactive toward isocyanates in the presence of blowing agents, catalysts and, if desired, auxiliaries and/or additives has been described many times. To produce foams based on polyisocyanate polyaddition products, use is usually made of aromatic diisocyanates which are reacted with suitable compounds which are reactive toward isocyanates. Disadvantages of foams produced in this way are that they have the tendency to discolor under the action of light and during storage and also, in some applications, their hydrophobic character.

Lightfast foams are usually produced on the basis of aromatic isocyanates and UV stabilizers. A disadvantage here is that these UV stabilizers are extremely expensive and are effective for only a limited time. Foams produced from aliphatic isocyanates have hitherto been known only for very specific applications. WO 89/05830 describes polyurethane networks prepared from polyesterols and lysine diisocyanate. However, the preparation of such polyurethanes is complicated and for some applications impossible. Polyurethanes based on aliphatic isocyanates are also described in U.S. Pat. No. 4,018,636, U.S. Pat. No. 4,263,070 and U.S. Pat. No. 3,281,378, but these documents contain no usable teachings on the production of foamed polyurethanes.

Foamed or unfoamed polyurethanes based on aliphatic isocyanates are described in EP-A 210 566 and EP-A 275 010. Disadvantages of these technical teachings are the high content of volatile monomeric aliphatic isocyanates (EP-A 275 010) or the low content of isocyanate groups (EP-A 210 566), which are required for the blowing reaction with water.

SUMMARY OF THE INVENTION

It is an object of the present invention to develop a process for producing foams based on polyisocyanate polyaddition products by reacting isocyanates with compounds which are reactive toward isocyanates and have a molecular weight of from 400 to 8000 in the presence of blowing agents, catalysts and, if desired, chain extenders and/or crosslinkers having a molecular weight of <400, auxiliaries and/or additives, by means of which it is possible to obtain foams which do not tend to discolor even after prolonged storage and which have a more hydrophilic character than the foams based on aromatic isocyanates and known from the prior art.

We have found that this object is achieved by using isocyanates having isocyanurate and/or biuret structures, at least one compound which is reactive toward isocyanates, has a molecular weight of from 400 to 8000 and contains at least 50% primary hydroxyl groups, as catalysts at least one tertiary amine and at least one metal salt plus from 0.5 to 5.3% by weight of water, based on the weight of the compounds which are reactive toward isocyanates and have a molecular weight of from 400 to 8000, and carrying out the reaction at >40° C.

DETAILED DESCRIPTION OF THE INVENTION

Suitable isocyanates having isocyanurate and/or biuret structures are the aliphatic and/or cycloaliphatic diisocyanates known per se which can have been biuretized and/or isocyanuratized by generally known methods and contain at least one, preferably at least two, free isocyanate groups, particularly preferably three free isocyanate groups. This trimerization triples the molecular weight of the aliphatic isocyanates and increases the functionality.

Specific examples are: alkylene diisocyanates having from 4 to 12 carbon atoms in the alkylene radical, for example dodecane 1,12-diisocyanate, 2-ethyl-tetramethylene 1,4-diisocyanate, 2-methylpentamethylene 1,5-diisocyanate, tetramethylene 1,4-diisocyanat and preferably lysine ester diisocyanates (LDI) and/or hexamethylene 1,6-diisocyanate (HDI); cycloaliphatic diisocyanates such as cyclohexane 1,3- and 1,4-diisocyanate and also any mixtures of these isomers, hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures and/or 1-isocyanato-3,3,5-trimethyl-5-isocyanatomethylcyclohexane (IPDI).

The trimerization of the isocyanates to prepare the isocyanates having an isocyanurate structure can be carried out at customary temperatures in the presence of known catalysts, for example phosphines and/or phospholine derivatives, amines, alkali metal salts, metal compounds and/or Mannich bases. Trimerized isocyanates containing isocyanurate structures are also commercially available. Isocyanates having biuret structures can be prepared by generally known methods, for example by reaction of the diisocyanates mentioned with water or, for example, diamines, with a urea derivative being formed as intermediate. Biuretized isocyanates are also commercially available.

The isocyanates having isocyanurate and/or biuret structures can be used together with further isocyanates, preferably organic diisocyanates, in the process of the present invention. Suitable further isocyanates are the abovementioned aliphatic and cycloaliphatic diisocyanates and also aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. Furthermore, in addition to the isocyanates of the present invention having isocyanurate and/or biuret structures, it is possible to use diisocyanates and/or polyisocyanates containing ester, urea, allophanate, carbodiimide, uretdione and/or urethane groups in the process of the present invention. Specific examples are: organic polyisocyanates containing urethane groups and having NCO contents of from 33.6 to 15% by weight, preferably from 31 to 21% by weight, based on the total weight, diphenylmethane 4,4'-diisocyanate modified with low molecular weight diols, triols, dialkylene glycols, trialkylene glycols or polyoxyalkylene glycols having molecular weights of up to 6000, in particular molecular weights up to 1500, modified diphenylmethane 4,4'- and 2,4'-diisocyanate mixtures, modified crude MDI or tolylene 2,4- or 2,6-diisocyanate, with examples of dialkylene glycols or polyoxyalkylene glycols which can be used individually or as mixtures being: diethylene glycol, dipropylene glycol, polyoxyethylene, polyoxypropylene and polyoxypropylene-polyoxyethylene glycols, triols and/or tetrols. Also suitable are prepolymers containing NCO groups, having NCO contents of from 25 to 3.5% by weight, preferably from 21 to 14% by weight, based on the total weight, and prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or crude MDI. Liquid polyisocyanates containing carbodiimide groups and having NCO contents of from 33.6 to 15% by weight, preferably from 31 to 21% by weight, based on the total weight, for example those based on diphenylmethane 4,4'-, 2,4'- and/or 2,2'-diisocyanate and/or tolylene 2,4- and/or 2,6-diisocyanate have also been found to be useful. The modified polyisocyanates can, if desired, be mixed with one another or with unmodified organic polyisocyanates such as diphenylmethane 2,4'- and/or 4,4'-diisocyanate, crude MDI, tolylene 2,4- and/or 2,6-diisocyanate.

The isocyanates having isocyanurate and/or biuret structures are preferably used together with aliphatic and/or cycloaliphatic diisocyanates, with preferably from 50 to 100% of the NCO groups used in the process of the present invention being provided by the isocyanates having isocyanurate and/or biuret structures. Particularly preferably, the isocyanates having isocyanurate and/or biuret structures are used as the only compounds containing isocyanate groups in the process of the present invention.

As compounds which are reactive toward isocyanates, hereinafter also referred to as polyols, having a molecular weight of from 400 to 8000, preference is given, according to the present invention, to using those which contain at least 50% primary hydroxyl groups. In addition to polyols containing at least 50% primary hydroxyl groups, it is possible, if desired, to use further customary polyols which contain less than 50% primary hydroxyl groups. Preference is given to using a mixture of compounds which are reactive toward isocyanates and have a molecular weight of from 400 to 8000 in which mixture the sum of the compounds which are reactive toward isocyanates and have a molecular weight of from 400 to 8000 has at least 50% primary hydroxyl groups.

The polyols mentioned below by way of example are, insofar as they have at least 50% primary hydroxyl groups, the polyols according to the present invention and otherwise are polyols which can be used, if desired, in addition to the polyols according to the present invention. Preferably, at least 60%, particularly preferably from 80 to 100%, of the groups which are reactive toward isocyanates are primary hydroxyl groups.

Polyols used are advantageously those having a functionality of from 2 to 8, preferably from 2 to 6, and a molecular weight of from 400 to 8000, preferably from 400 to 3000. The polyols used depend on the desired properties of the polyurethane foam to be produced. Polyols which have been found to be useful are, for example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols. The hydroxyl number of the polyhydroxy compounds is generally from 28 to 850 mg KOH/g and preferably from 35 to 600 mg KOH/g.

Polyol components used for rigid foams are high-functionality polyols, in particular polyether polyols based on high-functionality alcohols, sugar alcohols, saccharides and/or high-functionality amines, if desired in admixture with low-functionality alcohols and/or amines, and propylene oxide and/or ethylene oxide, while polyol components used for flexible foams are 2- and/or 3-functional polyether polyols and/or polyester polyols based on glycerol and/or trimethylolpropane and/or glycols and alkylene oxides or aliphatic and/or aromatic dicarboxylic acids. The polyether polyols are prepared by known methods. Depending on the use, the necessary initiator substances are mixed, admixed with a basic catalyst, in particular alkali metal or alkaline earth metal hydroxides, and reacted with alkylene oxides, in particular ethylene oxide and/or propylene oxide, at elevated temperatures and pressures.

After the synthesis the catalyst is removed by acid neutralization, distillation and filtration. Acids used are, in particular, the two inorganic acids hydrochloric acid an/or phosphoric acid because of the precise control of the equivalence point and the technologically simple removal of any excess of acid.

Further polyols which can be used are polyether polyols which are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably from 2 to 6, reactive hydrogen atoms in bound form, or by cationic polymerization using Lewis acids such as antimony pentachloride, boron fluoride etherate, etc. or bleaching earth as catalysts.

Suitable alkylene oxides for preparing the polyols are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Preference is given to using alkylene oxides which lead to primary hydroxyl groups in the polyol. The polyols used are particularly preferably those whose alkoxylation has been concluded using ethylene oxide and thus have primary hydroxyl groups.

Examples of suitable initiator molecules are: water, organic dicarboxylic acids such as succinic acid, adipic acid, phthalic acid and terephthalic acid, aliphatic and aromatic unalkylated, N-monoalkylated, N,N- and N,N'-dialkylated diamines having from 1 to 4 carbon atoms in the alkyl radical, for example unalkylated, monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Further suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric and/or trihydric, alcohols such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether polyols have a functionality of preferably from 2 to 6 and in particular from 2 to 4 and molecular weights of from 400 to 3000, preferably from 400 to 2000.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, e.g. in a weight ratio of from 90:10 to 10:90, preferably from 70:30 to 30:70, advantageously in the abovementioned polyether polyols by generally known methods, and also polyether polyol dispersions which contain as disperse phase, usually in an amount of from 1 to 50% by weight, preferably from 2 to 25% by weight: e.g. polyureas, polyhydrazides, polyurethanes containing bound tertiary amino groups and/or melamine.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular diols are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, e.g. ε-caprolactone or hydroxycarboxylic acids, e.g. ω-hydroxycaproic acid.

To prepare the polyester polyols, the organic, e.g. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., under atmospheric pressure or under reduced pressure to the desired acid number which is advantageously less than 10, preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distil off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 480 to 3000, preferably from 600 to 2000 and in particular from 600 to 1500.

Suitable hydroxyl-containing polyacetals are, for example, the compounds which can be prepared from glycols such as diethylene glycol, triethylene glycol, 4,4'-dihydroxyethoxydiphenyldimethylmethane or hexanediol and formaldehyde. Suitable polyacetals can also be prepared by polymerization of cyclic acetals.

Suitable hydroxyl-containing polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, e.g. diphenyl carbonate or phosgene. The polyesteramides include, for example, the predominantly linear condensates obtained from polybasic, saturated, and/or unsaturated carboxylic acids or their anhydrides and polyfunctional saturated and/or unsaturated amino alcohols or mixtures of polyfunctional alcohols and aminoalcohols and/or polyamines.

Suitable polyether polyamines can be prepared from the abovementioned polyether polyols by known methods. Examples which may be mentioned are the known cyanoalkylation of polyoxyalkylene polyols and subsequent hydrogenation of the nitrile formed or the known partial or complete amination of polyoxyalkylene polyols with amines or ammonia in the presence of hydrogen and catalysts.

As compounds which are reactive toward isocyanates, chain extenders and/or crosslinkers having a molecular weight of <400 may also be used in the process of the present invention. The addition of chain extenders, crosslinkers or, if desired, mixtures thereof can prove to be advantageous for modifying the mechanical properties, e.g. the hardness. Chain extenders and/or crosslinkers used are diols and/or triols having molecular weights of <400, preferably from 60 to 300. Examples of suitable chain extenders/crosslinkers are aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for producing the polyurethane foams, they are advantageously used in an amount of from 0 to 20% by weight, preferably from 2 to 8% by weight, based on the weight of polyols having a molecular weight of from 400 to 8000.

As blowing agent for producing the polyurethane foams, use is made of water, which reacts with isocyanate groups to form carbon dioxide, in an amount of from 0.5 to 5.3% by weight, based on the weight of the compounds which are reactive toward isocyanates and have a molecular weight of from 400 to 8000. In addition to the water, it is possible to use further customary blowing agents, for example physically acting blowing agents. Suitable physically acting blowing agents are liquids which are inert toward the organic, modified or unmodified polyisocyanates and have boiling points below 100° C., preferably below 50° C., in particular from −50° C. to 30° C., at atmospheric pressure so that they vaporize under the action of the exothermic polyaddition reaction. Examples of such preferred liquids are alkanes, such as heptane, hexane, n-and iso-pentane, preferably industrial mixtures of n- and iso-pentanes, n- and iso-butane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as customary fluorinated hydrocarbons. It is also possible to use mixtures of these low-boiling liquids with one another and/or with other substituted or substituted hydrocarbons. Further suitable blowing agents are organic carboxylic acids such as formic acid, acetic acid, oxalic acid, ricinoleic acid and carboxyl-containing compounds. The blowing agents are usually added to the compounds which are reactive toward isocyanates and have a molecular weight of from 400 to 8000. However, they can be added to the isocyanate component or, as a combination, both to the polyol component and to the isocyanate component or premixtures of these components with the customary formative components. The amount of blowing agent or blowing agent mixture used is from 0.5 to 25% by weight, preferably from 3 to 15% by weight, in each case based on the polyol component containing the compounds which are reactive toward isocyanates. The water used as blowing agent is preferably added to the polyol component.

As catalysts for producing the polyurethane foams, use is made of at least one tertiary amine and at least one metal salt which strongly accelerate the reaction of isocyanates with the compounds which are reactive toward isocyanates, preferably using a total catalyst content of from 0.001 to 15% by weight, in particular from 0.05 to 6% by weight, based on the weight of the compounds which are reactive toward isocyanates and have a molecular weight of from 400 to 8000. Particular preference is given to using from 0.1 to 8% by weight of at least one tertiary amine and from 0.01 to 3% by weight of at least one metal salt, where the percentages by weight are based on the weight of the compounds which are reactive toward isocyanates and have a molecular weight of from 400 to 8000.

Examples of tertiary amines which can be used are triethylamine, tributylamine, dimethylbenzylamine, dicyclohexylmethylamine, dimethylcyclohexylamine, bis(N,N-dimethylaminoethyl) ether, bis(dimethylaminopropyl) urea, N-methylmorpholine or N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo(2.2.0)octane, 1,4-diazabicyclo(2.2.2)octane (Dabco) and alkanolamine compounds such as triethanolamine, triisopropanolamine, N-methyldiethanolamine and N-ethyldiethanolamine, dimethylaminoethanol, 2-(N,N'-dimethylaminoethoxy) ethanol, N,N',N"-tris(dialkylaminoalkyl) hexahydrotriazines, e.g. N,N',N"-tris-(dimethylaminopropyl)-s-hexahydrotriazine. Preference is given to using triethylenediamine, pentamethyldiethylenetriamine and/or bis(dimethylaminoethyl) ether.

Metal salts which can be used are, for example, inorganic and/or organic compounds of iron, lead, zinc and/or tin in customary oxidation states of the metal, for example iron(II) chloride, zinc chloride, lead octoate and preferably tin salts such as tin dioctoate, tin diethylhexanoate, dibutyltin dilaurate and/or dibutyltin dilaurylmercaptide.

In addition to the catalysts according to the present invention, it is possible to use further catalysts, for example amidines, such as 2,3-dimethyl-3,4,5,6-tetrahydropyrimidine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups.

If desired, further auxiliaries and/or additives can be incorporated into the reaction mixture for producing the polyurethane foams. Examples which may be mentioned are surface-active substances, foam stabilizers, cell regulators, fillers, dyes, pigments, flame retardants, hydrolysis inhibitors, fungistatic and bacteriostatic substances. Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, e.g. diethylamine oleate, diethanolamine stearate, diethanolamine ricinoleate, salts of sulfonic acids such as alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or stabilizing the foam. The surface-active substances are usually employed in amounts of from 0.01 to 5% by weight, based on 100% by weight of the compounds which are reactive toward isocyanates and have a molecular weight of from 400 to 8000. For the purposes of the present invention, fillers, in particular, reinforcing fillers, are the customary organic and inorganic fillers, reinforcing materials, weighting agents, agents for improving the abrasion behavior in paints, coating compositions, etc., known per se. Specific examples are: inorganic fillers such as siliceous minerals, for example sheet silicates such as antigorite, serpentine, hornblendes, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may be coated with a size. Examples of suitable organic fillers are: carbon, melamine, rosin, cyclopentadienyl resins and graft polymers and also cellulose fibers, polyamide, polyacrylonitrile, polyurethane or polyester fibers based on aromatic and/or aliphatic dicarboxylic esters and, in particular, carbon fibers. The inorganic and organic fillers can be used individually or as mixtures and are advantageously incorporated into the reaction mixture in amounts of from 0.5 to 50% by weight, preferably from 1 to 40% by weight, based on the weight of the isocyanates and the total weight of the compounds which are reactive toward isocyanates; however, the content of mats, nonwovens and woven fabrics of natural and synthetic fibers can reach values of up to 80% by weight. Suitable flame retardants are, for example, tricresyl phosphate, tris(2-chloroethyl) phosphate, tris(2-chloropropyl) phosphate, tris(1,3-dichloropropyl) phosphate, tris-(2,3-dibromopropyl) phosphate, tetrakis(2-chloroethyl)ethylene diphosphate, dimethyl methanephosphonate, diethyl diethanolaminomethylphosphonate and also commercial halogen-containing flame retardant polyols. Apart from the abovementioned halogen-substituted phosphates, it is also possible to use inorganic or organic flame retardants such as red phosphorous, hydrated aluminum oxide, antimony trioxide, arsenic oxide, ammonium polyphosphate and calcium sulfate, expandable graphite or cyanuric acid derivatives such as melamine, or mixtures of at least two flame retardants such as ammonium polyphosphates and melamine and also, if desired, maize starch or ammonium polyphosphate, melamine and expandable graphite and/or aliphatic or aromatic polyesters for making the polyisocyanate polyaddition products flame resistant. In general, it has been found to be advantageous to use from 5 to 50% by weight, preferably from 5 to 25% by weight, of the flame retardants mentioned, based on the compounds which are reactive toward isocyanates and have a molecular weight of from 400 to 8000.

To produce the polyurethane foams of the present invention, the isocyanates, the compounds which are reactive toward isocyanates and have a molecular weight of from 400 to 8000 and, if used, the chain extenders and/or crosslinkers having a molecular weight of <400 are reacted in such amounts that the equivalence ratio of NCO groups of the isocyanates to the sum of the reactive hydrogen atoms of the compounds which are reactive toward the isocyanates and have a molecular weight of from 400 to 8000 and, if used, the chain extenders and/or crosslinkers is 0.85–1.25:1, preferably 0.95–1.15:1 and in particular 1–1.05:1. If the rigid polyurethane foams contain at least some bound isocyanurate groups, it is usual to employ a ratio of NCO groups to the sum of the reactive hydrogen atoms of 1.5–60:1, preferably 1.5–8:1.

The polyurethane foams are advantageously produced by the one-shot process, for example by means of the high-pressure or low-pressure technique in open or closed molds, for example metal molds. The continuous application of the reaction mixture to suitable conveyor belts for producing panels is also customary.

It has been found to be particularly advantageous to employ the two-component process and to combine the compounds which are reactive toward isocyanates and have a molecular weight of from 400 to 8000, the blowing agent(s), the catalysts and, if used, the chain extenders and/or crosslinkers and auxiliaries and/or additives to form the component (A) and to use the isocyanates or mixtures of the isocyanates and, if desired, blowing agents as component (B).

Depending on the application, the starting components are mixed at from 0 to 100° C., preferably from 20 to 60° C., and introduced into the open mold or the closed mold which may, if desired, be under increased pressure or, in the case of a continuous workstation, applied to a belt which accommodates the reaction mixture. Mixing can, as has already been mentioned, be carried out mechanically by means of a stirrer or a stirring screw. According to the invention, the reaction temperature in the mold, i.e. the temperature at which the reaction takes place, is >40° C., preferably from 60 to 90° C.

Depending on the starting materials, all customary polyurethane foams, but in particular rigid and flexible polyurethane foams, can be produced by the process of the present invention.

The rigid polyurethane foams produced by the process of the present invention usually have a density of from 0.02 to 0.30 g/cm$^3$, preferably from 0.025 to 0.24 g/cm$^3$ and in particular from 0.03 to 0.1 g/cm$^3$. They are particularly suitable as insulation material in the building and refrigeration appliance sector, e.g. as intermediate layer for sandwich elements or for filling refrigerator housings or freezer chest housings with foam.

The flexible polyurethane foams produced by the process of the present invention usually have a density of from 15 to 100 kg/m$^3$ and are preferably used in the furniture and automobile sectors, particularly preferably as upholstery material.

Preference is given to producing pliable polyurethane foams as specified in DIN 7726 by the process of the present invention. These foams particularly preferably have a compressive strength in accordance with DIN 53477 of less than 20 kpas.

EXAMPLES

The invention is illustrated by the examples below.

The tables show the reaction mixtures used in the examples; in the tables the numbers for the components polyol(s), water, catalyst(s) and stabilizer(s) indicate the amount in grams of the components polyol(s), water, catalysts) and stabilizer(s) present in the respective A component.

100 g in each case of the A component comprising polyol(s), water, catalyst(s) and stabilizer(s) shown in Tables 1 and 2 were mixed in a 500 ml beaker with the indicated amount of isocyanate by means of a laboratory stirrer, placed in a 1000 ml beaker and reacted.

The reaction parameters such as temperature, cream time, fiber time and rise time and also the density and an evaluation of the foams produced are likewise shown in the tables.

TABLE 1

| | Example | | | | | |
|---|---|---|---|---|---|---|
| | 1 | 2 | 3 | 4 | 5 | 6 |
| Polyol 1 [g] | — | — | — | 37.5 | 37.5 | 37.5 |
| Polyol 2 [g] | — | — | — | 37.5 | — | — |
| Polyol 3 [g] | — | — | — | — | 37.5 | 37.5 |
| Polyol 4 [g] | 89 | 89 | — | — | — | — |
| Polyol 5 [g] | — | — | 93.5 | — | — | — |
| Polyol 6 [g] | — | — | — | 15 | 21 | 16 |
| Water [g] | 2 | 2 | — | 2 | 2 | 2 |
| Cat. 1 [g] | 2 | 2 | 1.5 | 1 | 1 | — |
| Cat. 2 [g] | — | — | — | 6 | — | 6 |
| Cat. 3 [g] | 6 | 6 | 4 | — | — | — |
| Stab. 1 [g] | 0.5 | 0.5 | 0.5 | 0.5 | 0.5 | 0.5 |
| Stab. 2 [g] | 0.5 | 0.5 | 0.5 | 0.5 | 0.5 | 0.5 |
| NCO 1 [g] | 168 | 168 | 168 | — | — | — |
| NCO 2 [g] | — | — | — | 89 | 89 | 89 |
| T[°C.] | 25 | 60 | 60 | 80 | 80 | 80 |

TABLE 1-continued

| | Example | | | | | |
|---|---|---|---|---|---|---|
| | 1 | 2 | 3 | 4 | 5 | 6 |
| cream time [s] | — | 40 | — | 40 | — | — |
| fiber time [s] | — | 170 | — | 120 | — | — |
| rise time [s] | — | 210 | — | 160 | — | — |
| Density [g/l] | — | 69 | — | 68 | — | — |
| Example | 1 | 2 | 3 | 4 | 5 | 6 |
| Assessment of the foam | no foam can be produced | very coarse foam | no foam can be produced | fine foam | nofoam can be produced | no foam canbe produced |

TABLE 2

| | Example | | | |
|---|---|---|---|---|
| | 7 | 8 | 9 | 10 |
| Polyol 1 | 37.5 | 37.5 | 37.5 | 21 |
| Polyol 2 | — | — | — | — |
| Polyol 3 | 37.5 | 37.5 | 37.5 | 48.5 |
| Polyol 4 | — | — | — | — |
| Polyol 5 | — | — | — | — |
| Polyol 6 | 16 | 16 | 16 | 20 |
| Water | 2 | 6 | 2 | 3.5 |
| Cat. 1 | 1 | 1 | 1 | 2 |
| Cat. 2 | 6 | 6 | 6 | 6 |
| Cat. 3 | — | — | — | — |
| Stab. 1 | 0.5 | 0.5 | 0.5 | 0.5 |
| Stab. 2 | 0.5 | 0.5 | 0.5 | 0.5 |
| NCO 1 | — | — | — | — |
| NCO 2 | 89 | 140 | 89 | 116 |
| T [°C.] | 30 | 80 | 80 | 80 |
| cream time | — | — | 55 | 35 |
| fiber time | — | — | 200 | 110 |
| rise time | — | — | 240 | 130 |
| Density [g/l] | — | — | 79 | 48 |
| Assessment of the foam | no foamcan be produced | foamcan no be produced | foamcan fine ble foam | fine flexible foam |

Polyol 1: Polyethylene glycol, hydroxyl number 190 mg KOH/g;
Polyol 2: Polyetherol based on glycerol and propylene oxide, hydroxyl number 55 mg KOH/g;
Polyol 3: Polyetherol based on glycerol, alkoxylated using propylene oxide and capped using ethylene oxide, hydroxyl number 55 mg KOH/g;
Polyol 4: Polyetherol based on sucrose, glycerol, water and propylene oxide, hydroxyl number 490 mg KOH/g;
Polyol 5: Polyetherol based on sucrose, glycerol and water, alkoxylated using propylene oxide and capped using ethylene oxide, hydroxyl number 490 mg KOH/g;
Polyol 6: Polyetherol based on glycerol, alkoxylated using propylene oxide and capped using ethylene oxide, hydroxyl number 550 mg KOH/g;
Cat. 1: Tin catalyst (Formrez UL 32, from Witco);
Cat. 2: Tertiary amine (Lupragen® N301, BASF Aktiengesellschaft);
Cat. 3: Tertiary amine (Lupragen® N206, BASF Aktiengesellschaft);
Stab. 1: Foam stabilizer based on silicone (B 8404, from Goldschmidt);
Stab. 2: Foam stabilizer based on silicone (B 8919, from Goldschmidt);
NCO 1: Biuretized hexamethylene diisocyanate (Basonat® HB 100, BASF Aktiengesellschaft);
NCO 2: Isocyanuratized hexamethylene diisocyanate (Basonat® HI 100, BASF Aktiengesellschaft);
T [° C.]: Temperature at which the reaction mixture is reacted;
Cream time: Cream time in seconds;
Fiber time: Fiber time in seconds;
Rise time: Rise time in seconds.

The Comparative Examples 1, 2, 3, 5, 6, 7 and 8 have the following differences from the teachings of the present invention:

In Examples 1 and 2, the reaction mixtures prepared contain no polyol having at least 50% primary hydroxyl groups. In addition, in Example 1 the reaction is carried out at 25° C. In Example 3, no water is used. The reaction systems of Examples 5 and 6 have no combination of amine catalyst and metal salt catalyst. Example 7 was carried out at a low temperature of 30° C. which is not according to the present invention and the reaction system of Example 8 had a water content which is too high. No high quality foams could be produced in these comparative examples. Either the foams produced had cells which were too coarse, or else the foams collapsed.

The foams produced according to the present invention in Examples 4, 9 and 10, i.e. using at least one polycl which has at least 50% primary hydroxyl groups (polyols 1, 3, 5 and 6), from 0.5 to 5.3% by weight of water, tin and amine catalysts at a reaction temperature of >40° C., display excellent reaction parameters. The foams produced prove to be light-fast and are very suitable for producing upholstery foams.

We claim:

1. A process for producing foams based on polyisocyanate polyaddition products comprising reacting isocyanates with compounds which are reactive toward isocyanates and have a molecular weight of from 400 to 8000 in the presence of blowing agents, catalysts and, optionally, chain extenders and/or crosslinkers having a molecular weight of <400, auxiliaries and/or additives, wherein said isocyanates comprise isocyanuratized and/or biuretized hexamethylene 1,6-diisocyanate, 1-isocyanato-3,3,5-trimethyl-5-isocyanatomethylcyclohexane and/or lysine ester diisocyanate, said compounds which are reactive toward isocyanates contain at least 50% primary hydroxyl groups, said catalysts comprise from 0.1 to 8% by weight of at least one tertiary amine and from 0.01 to 3% by weight of at least one metal salt, said blowing agent comprises from 0.5 to 5.3% by weight of water, where the percentages by weight are based on the weight of the compounds which are reactive toward isocyanates, and the reaction is carried out at >40° C.

2. A process as claimed in claim 1, wherein polyether polyalcohols containing at least 50% primary hydroxyl groups are used as compounds which are reactive toward isocyanates.

3. A process as claimed in claim 1, wherein triethylenediamine, pentamethyldiethylenetriamine and/or bis(dimethylaminoethyl) ether together with dibutyltin dilaurate, tin dioctoate and/or dibutyltin dilaurylmercaptide are used as catalysts.

4. A process as claimed in claim 1, wherein the sum of the compounds which are reactive toward isocyanates and have a molecular weight of from 400 to 8000 contains at least 50% primary hydroxyl groups.

5. A foam based on polyisocyanate polyaddition products obtained by a process as claimed in any of claims 1 to 4.

6. An upholstery material comprising foams based on polyisocyanate polyaddition products as claimed in claim 5.

7. A foam based on polyisocyanate polyaddition products comprising the reaction product of (a) an isocyanate with (b) a compound which is reactive toward isocyanates and has a molecular weight of from 400 to 8000 in the presence of (c) a blowing agent, (d) a catalyst and, optionally, (e) a chain extender and/or crosslinker having a molecular weight of less than 400, and (f) auxiliaries and/or additives, wherein said isocyanate (a) comprises an isocyanuratized and/or biuretized hexamethylene 1,6-diisocyanate, 1-isocyanato-3,3,5-trimethyl-5-isocyanatomethylcyclohexane and/or lysine ester diisocyanate, said compound (b) contains at least 50% primary hydroxyl groups, said catalyst (d) comprises from 0.1 to 8% by weight of at least one tertiary amine and from 0.01 to 3% by weight of at least one metal salt, said blowing agent (c) comprises from 0.5 to 5.3% by weight of water, wherein the percentages by weight are based on the weight of the component (b) and the reaction is carried out at less than 40° C.

8. A foam as claimed in claim 7, wherein component (b) comprises polyether polyalcohols containing at least 50% primary hydroxyl groups.

9. A foam as claimed in claim 7, wherein said catalyst (d) comprises trimethylenediamine, pentamethyldiethylenetriamine and/or bis(dimethylamino ethyl)ether together with dibutyltin dilaurate, tin dioctoate and/or dibutyltin dilaurylmercaptide.

10. A foam as claimed in claim 9, wherein component (b) contains at least 50% primary hydroxyl groups.

* * * * *